Apr. 17, 1923.
F. N. KREISSL
OPHTHALMIC MOUNTING
Filed Nov. 21, 1918
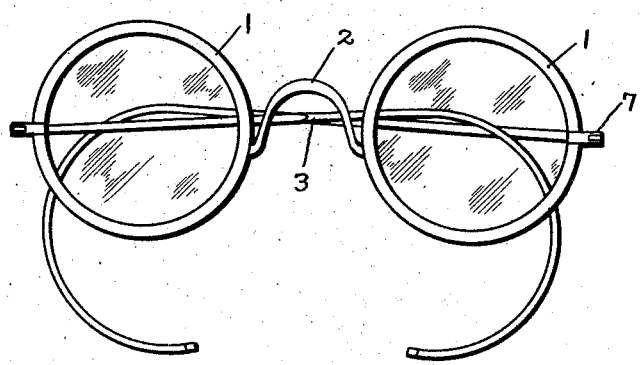
FIG. I
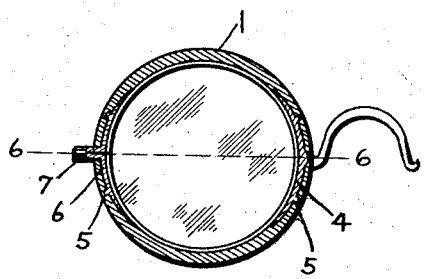
FIG. II
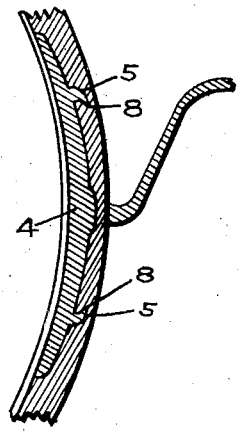
FIG. III
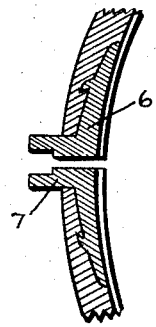
FIG. IV
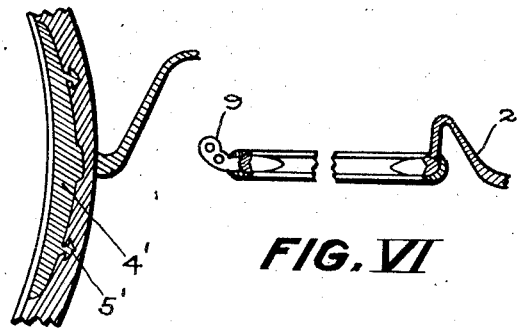
FIG. V    FIG. VI
INVENTOR
FRANK N. KREISSL
BY
H. H. Styll & H. K. Parsons
ATTORNEY Patented Apr. 17, 1923.

1,451,735

UNITED STATES PATENT OFFICE.

FRANK N. KREISSL, OF CHICAGO, ILLINOIS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed November 21, 1918. Serial No. 263,550.

*To all whom it may concern:*

Be it known that I, FRANK N. KREISSL, a citizen of the United States, residing at Chicago, in the county of Cook and State of Illinois, have invented certain new and useful Improvements in Ophthalmic Mountings, of which the following is a specification.

This invention relates to new and useful improvements in spectacles, and more particularly to the lens holding frames for spectacles and eyeglasses, the main object of the present invention being the provision of means whereby the visibility and quantity of metal used will be reduced to a minimum.

Another object of the present invention is the provision of means for securing the non-metallic lens frames used in spectacles and eyeglasses to the nose bridge and temples without the necessity of using a continuous metallic rim, as has been done heretofore.

A further object of the invention is the provision of metallic fastening members which are embedded within the non-metallic frames and either secured or integrally formed with the temples and nose bridge, whereby the non-metallic frames will be held securely in their proper positions With the above and other objects in view the invention consists in the novel features of construction and the combination and arrangement of parts hereinafter more fully set forth, pointed out in the claims, and shown in the accompanying drawings, in which:

Figure I is a front elevation of a pair of spectacles constructed in accordance with the invention.

Figure II is a longitudinal sectional view of one of the lens frames.

Figure III is an enlarged detail sectional view of one side of the lens frame.

Figure IV is a similar view illustrating the opposite side of the frame.

Figure V is a similar view illustrating a slightly modified form of the invention.

Figure VI is a transverse sectional view taken on the line 6—6 of Figure II.

In carrying out the invention a pair of lens frames is provided as indicated by the numeral 1 in Figure I of the accompanying drawings, which are herein shown as constructed of non-metallic material, such as zylonite or the like, and connected by means of the bridge member 2. The ends of the rims 1 are connected together by my new and improved connecting members, and pivotally secured thereto are the temples 3. In the usual construction of framed eyeglasses and spectacles where a non-metallic outer casing is used, a supporting rim of metal is disposed within the non-metallic rim and arranged next to the lens whereby to securely retain the non-metallic rim in position upon the lens and at the same time provide means for securing the rim to the nose bridge and temples, but in the present construction the continuous rim of metal is eliminated and short connecting members are disposed upon the interior of the non-metallic rims 1, as indicated by the numeral 4, said connecting members being connected upon the inner side of the rim with the nose bridge 2, either by soldering or having them integrally formed therewith. These members 4 are disposed within the lens groove and embedded within the non-metallic material of which the lens frame 1 is composed, and provided with spur members 5 which engage within the non-metallic material so as to securely hold these members 4 in their proper position within the lens groove.

As illustrated in Figures II and IV, the metallic members 6, which are disposed within the rim opposite the members 4, are provided with the temple lugs 7, between which the end of the temples 3 are pivoted. These members 6 are also provided with spur members 5 adapted to be embedded in the non-metallic material to hold these members in their proper positions.

It will be noted that in placing these metallic members in position they are first placed within the lens groove in the non-metallic rim and pressure brought to bear upon them so that the spur members 5 will be securely embedded within the non-metallic rim whereby to provide a smooth groove within the rim 1, and at the same time securely hold the members against any relative movement with respect to the outer rim.

As illustrated in Figure III, these spur members 5 are disposed in such a manner that they will absolutely prevent any relative movement of the members 4 with respect to the outer rim 1, the *spur member as* illustrated in Figure III being provided with inwardly projecting tongues 8, which necessarily bite into the material of the rim 1 should any movement take place on the part of the members 4.

In Figure IV, I have illustrated in detail the manner of securing the two members 6 in position which hold the temples in their proper position. As shown in this figure the members 6 are provided with outwardly projecting arms or lugs 7 cut away at their outer ends to provide for the reception of the ends of the temples which are pivoted therebetween.

It is to be noted that while the portions 4 and 6 are so constructed as to be embedded in the interior of the non-metallic rim portion 1 and as provided with the retaining spurs 5 which hook into the zylonite and prevent relative circumferential movement of the parts, there are not in my invention any encircling bands or other parts permanently uniting the metallic and non-metallic portions of the frame so that in the absence of a lens it is possible to disengage either the bridge plate 4 or the end piece plates or members 6 from the rim 1. This is of advantage in that it permits of interchangeability of parts of the mounting when desired and of the re-use of the metallic parts with a new non-metallic rim, an impossibility with those constructions in which the parts are held by bending or clamping around of the metallic parts as the force necessary to loosen such parts destroys the appearance thereof, rendering them incapable of satisfactory further use.

In Figure V, there is illustrated a slightly modified form of means for holding the members 4' in their proper positions. In this form of the invention the lugs 5' are preferably of arrow shape formation whereby when they are once embedded in the material of the rims 1 they will be securely held against any relative movement. It will be noted that by having these fastening members of arrow shape formation once they are embedded within the material they are securely held against withdrawal or any further relative movement.

In Figure VI, there is illustrated the relative positions of the lens frames with respect to the nose guard 2 and the temple lugs 9, to which the temples are fastened. As stated in the foregoing, there is provided a simple and durable device which eliminates the necessity of using a continuous metallic rim within a non-metallic rim for supporting the same upon lenses of eyeglasses or spectacles, and at the same time reduces the visibility to a minimum. It will be noted that when this rim is applied to a lens, there will not be any metallic part of the rim visible from the outside.

What is claimed is:

1. In a device of the character described, the combination with a split lens receiving frame, of means for connecting the ends of the frame, including end piece members having divergently disposed arms, and means on the arms for detachably interlocking with the ends of the frames, said means being disposed in convergent relation whereby their grip on the frame is increased as the rim is placed under tension by tightening of the end pieces.

2. The combination with a composition rim member formed with a lens receiving groove, of a fitting and a plate portion carried by the fitting and embedded in the material of the frame, a portion of said plate interrupting the groove and having its inner face grooved in continuation of the groove in the rim, said plate having outwardly projecting portions embedded in the material of the rim to connect the parts.

In testimony whereof I have affixed my signature, in presence of two witnesses.

FRANK N. KREISSL.

Witnesses:
JOSEPH F. MUELLER,
W. F. WALLER.